(12) United States Patent
Jiang et al.

(10) Patent No.: US 11,271,684 B2
(45) Date of Patent: Mar. 8, 2022

(54) DATA TRANSMISSION METHOD AND APPARATUS, ELECTRONIC DEVICE, AND COMPUTER-READABLE STORAGE MEDIUM

(71) Applicant: BEIJING XIAOMI MOBILE SOFTWARE CO., LTD., Beijing (CN)

(72) Inventors: Xiaowei Jiang, Beijing (CN); Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 92 days.

(21) Appl. No.: 16/771,214

(22) PCT Filed: Dec. 28, 2017

(86) PCT No.: PCT/CN2017/119509
§ 371 (c)(1),
(2) Date: Jun. 9, 2020

(87) PCT Pub. No.: WO2019/127248
PCT Pub. Date: Jul. 4, 2019

(65) Prior Publication Data
US 2020/0304242 A1    Sep. 24, 2020

(51) Int. Cl.
*H04L 1/18* (2006.01)
*H04W 72/12* (2009.01)
*H04W 72/14* (2009.01)

(52) U.S. Cl.
CPC .......... *H04L 1/1812* (2013.01); *H04L 1/1887* (2013.01); *H04W 72/1268* (2013.01); *H04W 72/14* (2013.01)

(58) Field of Classification Search
CPC ............... H04L 1/1812; H04L 1/1887; H04W 72/1268; H04W 72/14
See application file for complete search history.

(56) References Cited

U.S. PATENT DOCUMENTS 8,457,022 B2 * 6/2013 Lindh ................... H04L 1/1812
  370/280
2005/0276249 A1 * 12/2005 Damnjanovic ....... H04L 1/1887
  370/335

(Continued)

FOREIGN PATENT DOCUMENTS

CN    102215590 A    10/2011
CN    103796327 A     5/2014

(Continued)

OTHER PUBLICATIONS

International Search Report of PCT Application No. PCT/CN2017/119509 dated Sep. 7, 2018, (4p).

(Continued)

*Primary Examiner* — Kevin C. Harper
*Assistant Examiner* — Henry Baron
(74) *Attorney, Agent, or Firm* — Arch & Lake LLP

(57) ABSTRACT

A data transmission method is provided. The method include, when the new data needs to be transmitted, starting from a first available transmission opportunity from among available transmission opportunities, attempting, in each available transmission opportunity of the available transmission opportunities, to acquire a protocol data unit generated by a media access control layer according to the new data; and when the protocol data unit is acquired, instructing, according to the number of times, a cycle period and a start time, an HARQ process to transmit the protocol data unit to the base station in each retransmission opportunity starting from the available transmission opportunity corresponding to the acquisition of the protocol data unit.

20 Claims, 6 Drawing Sheets

(56) References Cited

U.S. PATENT DOCUMENTS

| | | |
|---|---|---|
| 2013/0021988 A1 | 1/2013 | Chen |
| 2015/0264708 A1 | 9/2015 | Li et al. |
| 2018/0109358 A1 | 4/2018 | Xing et al. |

FOREIGN PATENT DOCUMENTS

| | | |
|---|---|---|
| CN | 106160931 A | 11/2016 |
| CN | 107197528 A | 9/2017 |

OTHER PUBLICATIONS

Ericsson, "Scheduling for HARQ-ACK Bundling for FeMTC", 3GPP TSG-RAN WG1 Meeting #88 R1-1701987, Feb. 17, 2017, Athens, Greece, (9p).

\* cited by examiner

DATA TRANSMISSION METHOD AND APPARATUS, ELECTRONIC DEVICE, AND COMPUTER-READABLE STORAGE MEDIUM

CROSS-REFERENCE

This Application is a National Stage of International Application No. PCT/CN2017/119509 filed on Dec. 28, 2017, the content of which is incorporated herein by reference in its entirety for all purposes.

TECHNICAL FIELD

The present disclosure relates to the field of communication technology, and more particularly to a data transmission method and apparatus, an electronic device, and a computer-readable storage medium.

BACKGROUND

In an New Radio (NR), a user device may transmit data to a base station in a bundling manner. That is, the base station allocates the number of times K that data needs to be retransmitted and k retransmission opportunities to the user device. The user device retransmits the data for k times in the k retransmission opportunities through the same Hybrid Automatic Repeat Request (HARQ) process.

SUMMARY

The present disclosure provide a data transmission method, an electronic device, and a computer-readable storage medium.

According to a first aspect of the present disclosure, a data transmission method is provided. The method may include:

receiving uplink resource allocation information and a redundancy version sequence transmitted by a base station, wherein the uplink resource allocation information is configured to indicate the number of times, a cycle period, a start time, HARQ information and a corresponding HARQ process of retransmission opportunities, and the redundancy version sequence is configured to indicate available transmission opportunities in the retransmission opportunities;

determining whether new data needs to be transmitted according to the HARQ information;

attempting, in each of the available transmission opportunities, to acquire a protocol data unit generated by a media access control layer according to the new data starting from a first available transmission opportunity in the available transmission opportunities when the new data needs to be transmitted; and instructing, starting from a corresponding available transmission opportunity when the protocol data unit is acquired, the HARQ process to transmit the protocol data unit to the base station in each of the retransmission opportunities according to the number of the times, the cycle period and the start time when the protocol data unit is acquired.

According to a second aspect of the present disclosure, an electronic device is provided. The device may include:

a processor; and a memory for storing instructions executable by the processor, wherein the processor is configured to:

receive uplink resource allocation information and a redundancy version sequence transmitted by a base station, wherein the uplink resource allocation information is configured to indicate the number of times, a cycle period, a start time, HARQ information and a corresponding HARQ process of retransmission opportunities, and the redundancy version sequence is configured to indicate available transmission opportunities in the retransmission opportunities;

determine whether new data needs to be transmitted according to the HARQ information;

attempt, in each of the available transmission opportunities, to acquire a protocol data unit generated by a media access control layer according to the new data starting from a first available transmission opportunity in the available transmission opportunities when the new data needs to be transmitted; and instruct, starting from a corresponding available transmission opportunity when the protocol data unit is acquired, the HARQ process to transmit the protocol data unit to the base station in each of the retransmission opportunities according to the number of the times, the cycle period and the start time when the protocol data unit is acquired.

According to a third aspect of the present disclosure, a computer-readable storage medium having stored thereon a computer program is provided, and the program, when executed by a processor, may cause the processor to implement the following steps:

receiving uplink resource allocation information and a redundancy version sequence transmitted by a base station, wherein the uplink resource allocation information is configured to indicate the number of times, a cycle period, a start time, HARQ information and a corresponding HARQ process of retransmission opportunities, and the redundancy version sequence is configured to indicate available transmission opportunities in the retransmission opportunities;

determining whether new data needs to be transmitted according to the HARQ information;

attempting, in each of the available transmission opportunities, to acquire a protocol data unit generated by a media access control layer according to the new data starting from a first available transmission opportunity in the available transmission opportunities when the new data needs to be transmitted; and instructing, starting from a corresponding available transmission opportunity when the protocol data unit is acquired, the HARQ process to transmit the protocol data unit to the base station in each of the retransmission opportunities according to the number of the times, the cycle period and the start time when the protocol data unit is acquired.

It is to be understood that both the foregoing general description and the following detailed description are exemplary and explanatory only and are not restrictive of the present disclosure.

BRIEF DESCRIPTION OF THE DRAWINGS

In order to describe the technical solutions in the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

The technical solutions in the embodiments of the present disclosure will be clearly and completely described below in conjunction with the accompanying drawings in the embodiments of the present disclosure. It is obvious that the described embodiments are only part but not all the embodiments of the present disclosure. All other embodiments obtained by those skilled in the art without creative efforts based on the embodiments in the present disclosure are within the protection scope of the present disclosure.

Sometimes, when transmitting new data in the bundling manner, the user device needs to start transmitting data from a first transmission opportunity in the K retransmission opportunities indicated by the base station. In this case, when a non-first transmission opportunity in current K transmission opportunities acquires the new data to be transmitted, it has to wait until a first transmission opportunity in a next cycle of K transmission opportunities is indicated by the base station prior to data transmission. As a result, delay in the new data transmission is longer.

Figure 1:
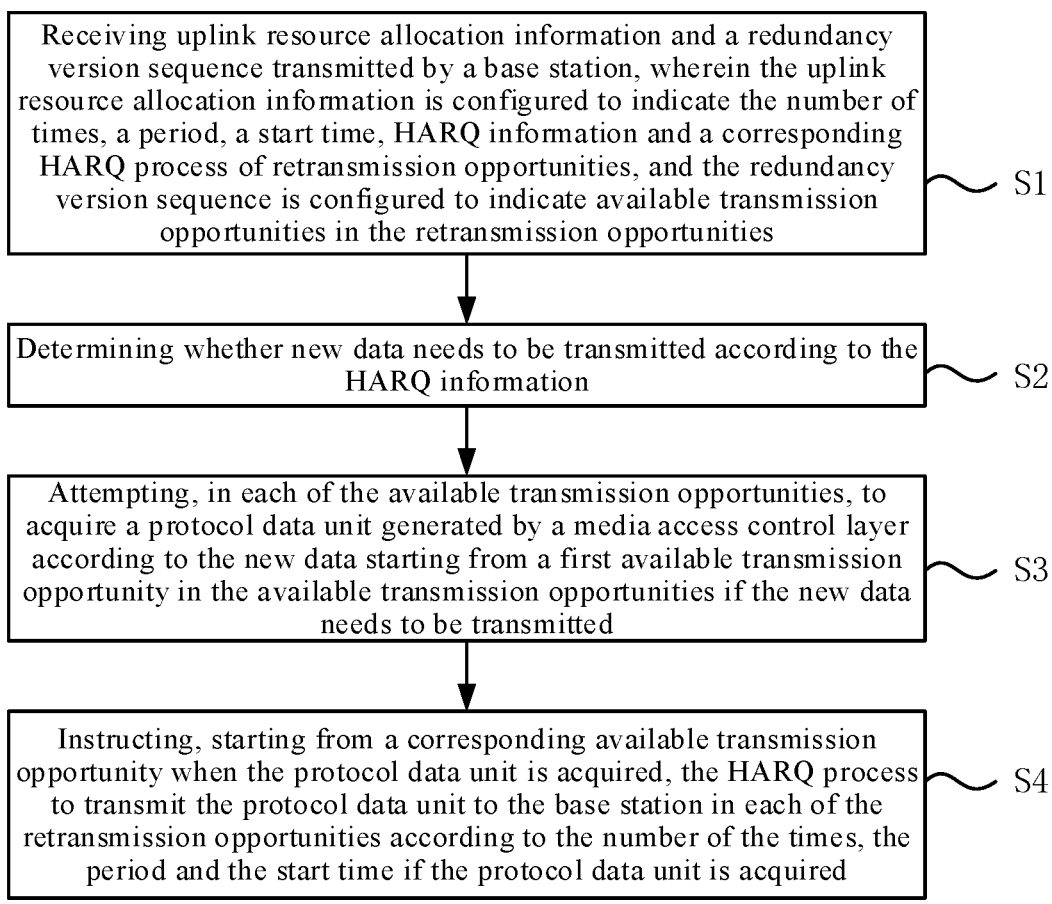
FIG. 1 is a schematic flowchart of a data transmission method according to an embodiment of the present disclosure.

FIG. 1 is a schematic flowchart of a data transmission method according to an embodiment of the present disclosure. The data transmission method shown in the present embodiment may be applied to a user device, such as a mobile phone, a tablet computer and a wearable device.

As illustrated in FIG. 1, the data transmission method shown in the present embodiment may include the following steps.

In step S1, an uplink resource allocation information and a redundancy version sequence transmitted by a base station are received, wherein the uplink resource allocation information is configured to indicate the number of times, a period, a start time, a HARQ information and a corresponding HARQ process of retransmission opportunities, and the redundancy version sequence is configured to indicate available transmission opportunities in the retransmission opportunities. The period may refer to a cycle period or a time period for the data transmission.

In an embodiment, the uplink resource allocation information may be an Uplink (UL) grant; and the base station may transmit the uplink resource allocation information to a user device through a Physical Downlink Control Channel (PDCCH), or may carry the uplink resource allocation information through a random access response message, or may carry the uplink resource allocation information through an Radio Resource Control (RRC) message.

In an embodiment, the redundancy version sequence may be allocated to the user device by the base station through the RRC message. A redundant bit may be contained in data transmitted in a retransmission opportunity. Redundant bits in the data corresponding to the different retransmission opportunities may be generated according to different generation manners. A redundancy version corresponds to the above generation manner; and multiple redundancy versions may form the redundancy version sequence. According to the present embodiment, the available transmission opportunities in the retransmission opportunities may also be determined according to the redundancy version sequence.

For example, if the redundancy version sequence is s1-0231, it may be determined that the available transmission opportunity in the retransmission opportunities is the first retransmission opportunity according to the redundancy version sequence.

For example, if the redundancy version sequence is s2-0303, it may be determined that the available transmission opportunity in the retransmission opportunities is an odd number of a retransmission opportunity according to the redundancy version sequence. For example, if the number of times of the retransmission opportunities is 8, the available transmission opportunity may be the first retransmission opportunity, the third retransmission opportunity, the fifth retransmission opportunity or the seventh retransmission opportunity in the 8 retransmission opportunities.

For example, if the redundancy version sequence is s3-0000, according to the redundancy version sequence, it may be determined that when the number of times of the retransmission opportunities is 8, the available transmission opportunity is the eighth retransmission opportunity in the 8 retransmission opportunities; or it may be determined that when the number of times of the retransmission opportunities is less than 8, the available transmission opportunity may be each of the retransmission opportunities.

In an embodiment, the number of times of the retransmission opportunities is the number of times of retransmission opportunities in one bundling transmission.

In step S2, it is determined whether new data needs to be transmitted according to the HARQ information.

In an embodiment, the HARQ information may include a new data indicator (NDI) field. Each HARQ process initiated by the user device corresponds to one NDI field. The user device may store the NDI field corresponding to each HARQ process, determines whether an NDI field of a new HARQ process is the same as an NDI field of the HARQ process initiated in the latest time with respect to the new HARQ process when initiating the new HARQ process, and determines that the new data needs to be transmitted if the above two NDI fields are different.

Of course, in addition to the NDI field, the HARQ information may further include other content for indicating whether the new data needs to be transmitted; and the content may be specifically set as required.

In step S3, it is attempted, in each of the available transmission opportunities, to acquire a protocol data unit generated by a media access control layer according to the new data starting from a first available transmission opportunity in the available transmission opportunities if the new data needs to be transmitted.

In an embodiment, when it is determined that the new data needs to be transmitted, the Media Access Control (MAC) layer may generate the Protocol Data Unit (PDU) according to the new data. Thus, it can be attempted to acquire the PDU generated by the MAC layer in each of the available transmission opportunities starting from the first available transmission opportunity.

In step S4, starting from a corresponding available transmission opportunity when the protocol data unit is acquired, the HARQ process is instructed to transmit the protocol data unit to the base station in each of the retransmission opportunities according to the number of the times, the period and the start time if the protocol data unit is acquired.

In an embodiment, if the protocol data unit is acquired, it may be determined that there is new data needs to be transmitted in the corresponding available transmission opportunity when the protocol data unit is acquired, so that the HARQ process is instructed to transmit the protocol data unit to the base station in each of the retransmission opportunities starting from the corresponding available transmission opportunity when the protocol data unit is acquired according to the number of the times, the period and the start time.

A start time and an end time of each of the retransmission opportunities after the corresponding available transmission opportunities when the protocol data unit is acquired may be determined according to the period and the start time. The number of remaining times of the retransmission opportunities after the corresponding available transmission opportunities when the protocol data unit is acquired may be determined according to the number of the times.

For example, if one bundling transmission contains 8 retransmission opportunities, the corresponding available transmission opportunity when the protocol data unit is acquired is the third retransmission opportunity in the 8 retransmission opportunities. In this case, sometimes, it is required to transmit the protocol data unit starting from the first retransmission opportunity in the retransmission opportunities corresponding to the bundling transmission after the current bundling transmission. As a result, the transmission of the protocol data unit is delayed by a time period corresponding to at least 5 retransmission opportunities. However, according to the embodiment of the present disclosure, the protocol data unit can be transmitted to the base station starting from the third retransmission opportunity in the current bundling transmission.

It can be seen that the protocol data unit is transmitted to the base station in each of the retransmission opportunities starting from the corresponding available transmission opportunity when the protocol data unit is acquired. Thus, it can ensure that when the new data needs to be transmitted, the base station can receive the protocol data unit containing the new data in time, thereby shortening delay in the transmission of the new data.

Optionally, the uplink resource allocation information is contained in an RRC message, and/or in a message of a physical downlink control channel, and/or in a random access response message.

In an embodiment, the base station may transmit the uplink resource allocation information to the user device through the RRC message, or may transmit the uplink resource allocation information to the user device through the physical downlink control channel, or may enable the uplink resource allocation information to be carried in a random access response when sending the random access response to the user device.

It should be noted that the base station may transmit the uplink resource allocation information to the user device through any one of the above three manners, or through any two of the above three manners, or through the above three manners. It may be particularly allocated as required.

Figure 2:
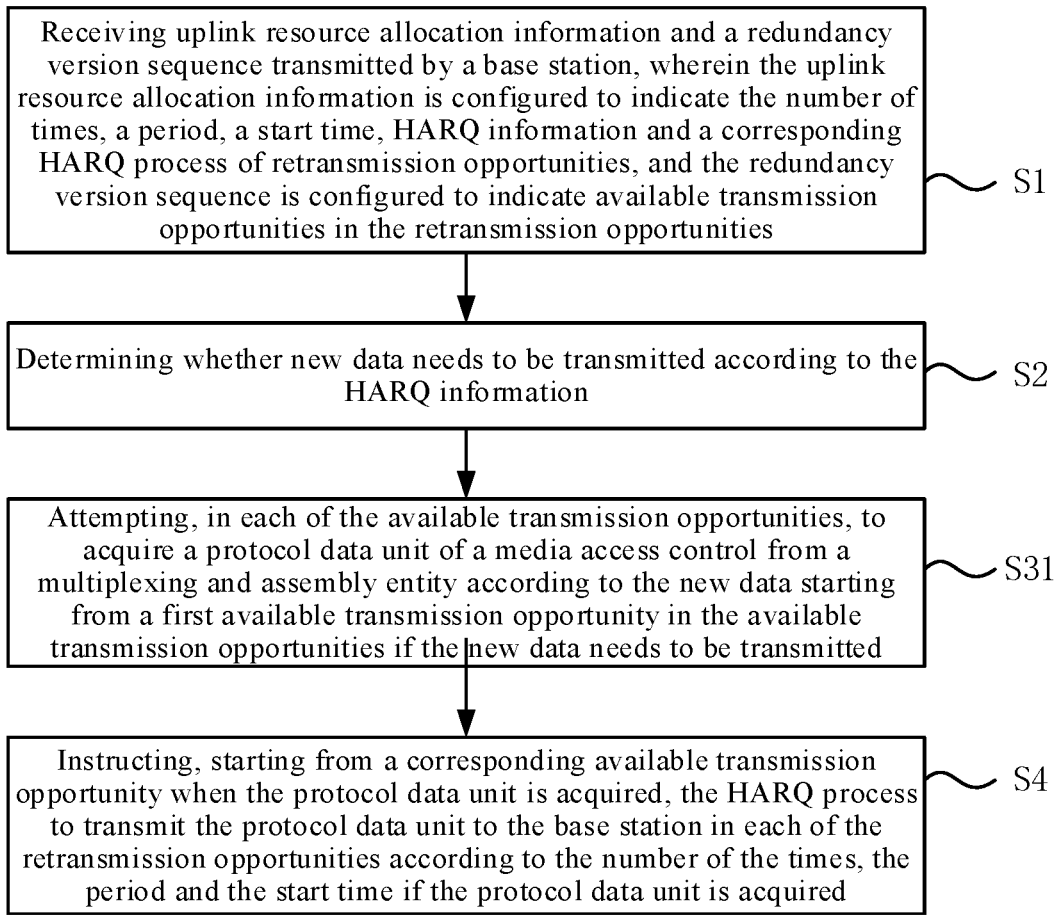
FIG. 2 is a schematic flowchart of another data transmission method according to an embodiment of the present disclosure.

FIG. 2 is a schematic flowchart of another data transmission method according to an embodiment of the present disclosure. As illustrated in FIG. 2, based on the embodiment illustrated in FIG. 1, the uplink resource allocation information is contained in the RRC message. Attempting to acquire the protocol data unit generated by the media access control layer according to the new data includes the following step.

In step S31, it is attempted to acquire the protocol data unit of the media access control from a multiplexing and assembly entity.

In an embodiment, if the uplink resource allocation information is contained in the RRC message, that is, the base station transmits the uplink resource allocation information to the user device through the RRC message, an HARQ entity in the user device may determine an HARQ process indicated by the uplink resource allocation information in a process of the user device according to the uplink resource allocation information. In addition, data (including the new data required to be transmitted) in each of logical channels of the RRC is assembled into the protocol data unit through the multiplexing and assembly entity. Thus, it can be attempted, in each of the available transmission opportunities, to acquire the protocol data unit of the media access control from the multiplexing and assembly entity starting from the first available transmission opportunity in the available transmission opportunities.

Figure 3:
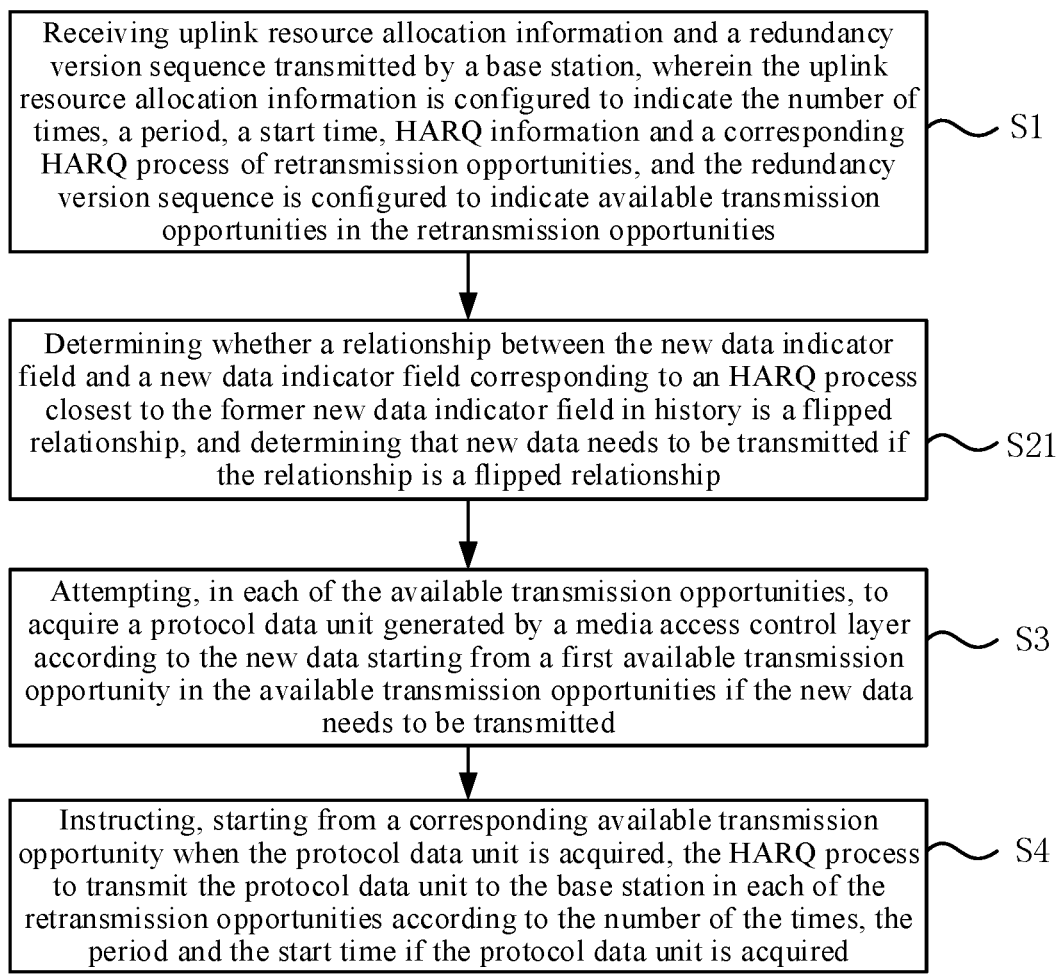
FIG. 3 is a schematic flowchart of yet another data transmission method according to an embodiment of the present disclosure.

FIG. 3 is a schematic flowchart of yet another data transmission method according to an embodiment of the present disclosure. As illustrated in FIG. 3, based on the embodiment illustrated in FIG. 1, the HARQ information includes a new data indicator field. Determining whether the new data needs to be transmitted according to the HARQ information includes the following step.

In step S21, it is determined whether a relationship between the new data indicator field and a new data indicator field corresponding to an HARQ process closest to the former new data indicator field in history is a flipped relationship, and it is determined that the new data needs to be transmitted if the relationship is a flipped relationship.

In an embodiment, since transmitting data through the HARQ technology specifically refers to retransmitting the data through multiple HARQ processes, a new data indicator field corresponding to the HARQ process may be set to 0 when the data is retransmitted, and a new data indicator field corresponding to the HARQ process may be set to 1 when new data is transmitted (it should be noted that the new data indicator field may include one character or multiple characters). Thus, when the data is retransmitted, the new data indicator field corresponding to the HARQ process in which the data is retransmitted for the last time is 0, and the relationship between this new data indicator field and a new data indicator field of 1 corresponding to an HARQ process in which the data is retransmitted for the first time in subsequent retransmission of new data is a flipped relationship. On the basis of this, whether the new data needs to be transmitted can be determined conveniently.

Figure 4:
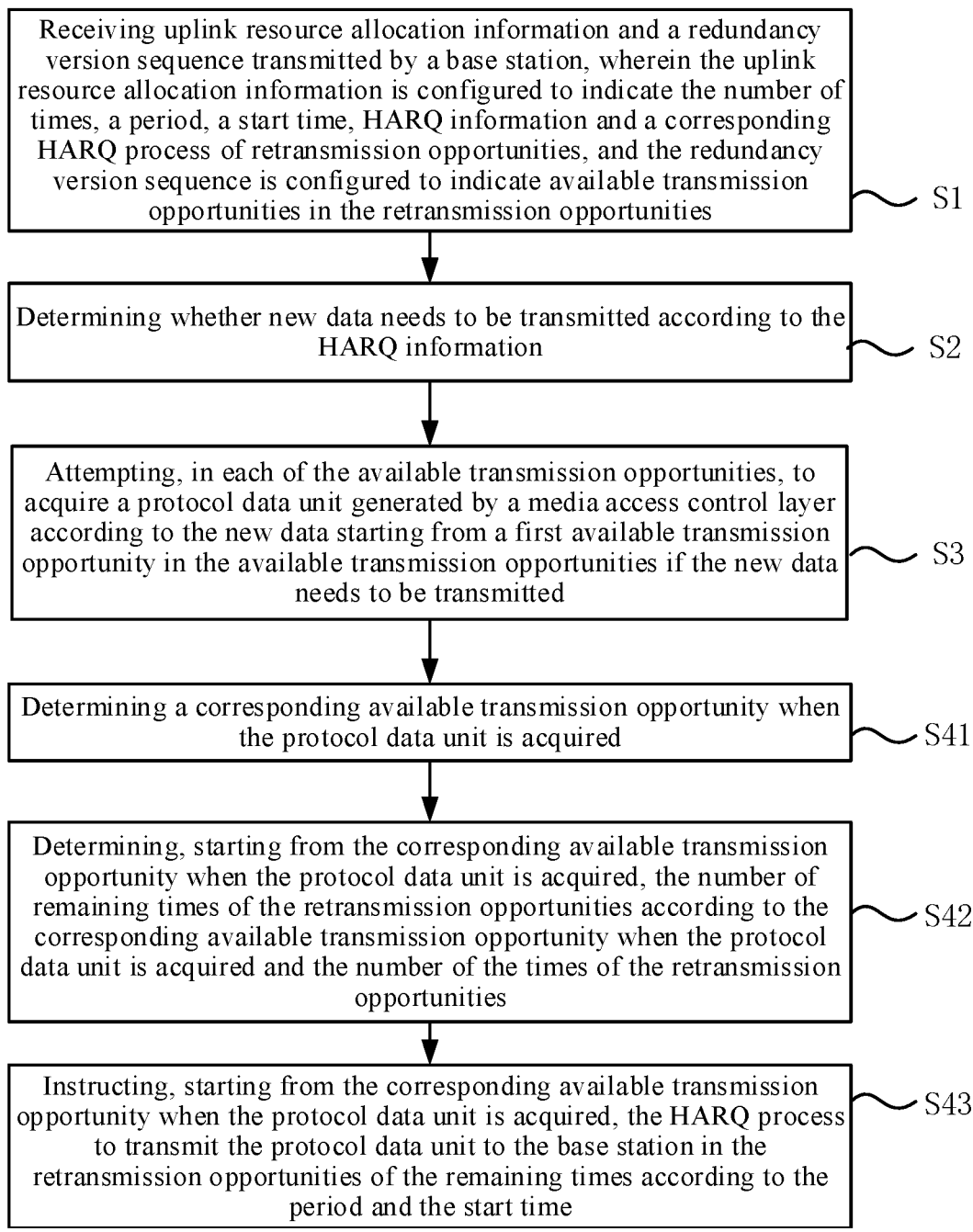
FIG. 4 is a schematic flowchart of still another data transmission method according to an embodiment of the present disclosure.

FIG. 4 is a schematic flowchart of yet another data transmission method according to an embodiment of the present disclosure. As illustrated in FIG. 4, based on the embodiment illustrated in FIG. 1, instructing, starting from the corresponding available transmission opportunity when the protocol data unit is acquired, the HARQ process to transmit the protocol data unit to the base station in each of the retransmission opportunities according to the number of the times, the period and the start time includes the following steps.

In step S41, it is determined the corresponding available transmission opportunity when the protocol data unit is acquired.

In step S42, it is determined, starting from the corresponding available transmission opportunity when the protocol data unit is acquired, the number of remaining times of the retransmission opportunities according to the corresponding available transmission opportunity when the protocol data unit is acquired and the number of the times of the retransmission opportunities.

In an embodiment, the numbers of the remaining times may be different according to different corresponding available transmission opportunities when the protocol data unit is acquired and different numbers of the times of the retransmission opportunities. For example, when the available transmission opportunity is the third retransmission opportunity in the retransmission opportunities, if one bundling transmission contains 8 retransmission opportunities, the number of the remaining times is 6; or if one bundling transmission contains 6 retransmission opportunities, the number of the remaining times is 4.

In step S43, starting from the corresponding available transmission opportunity when the protocol data unit is acquired, the HARQ process is instructed to transmit the protocol data unit to the base station in the retransmission opportunities of the remaining times according to the period and the start time.

In an embodiment, according to the period and the start time, a start time and an end time of each of the retransmission opportunities of the remaining times may be determined. Thus, a start time and an end time of the corresponding available transmission when the protocol data unit is acquired may be determined; and a start time and an end time of each of the retransmission opportunities after the corresponding available transmission when the protocol data unit is acquired may be acquired. On the basis of this, the start time and the end time of each of the retransmission opportunities of the remaining times are determined. Thus, the protocol data unit may be transmitted to the base station from the start time to the end time in each of the retransmission opportunities of the remaining times.

Corresponding to the foregoing embodiments of the data transmission method, the present disclosure further provides embodiments of a data transmission apparatus.

Figure 5:
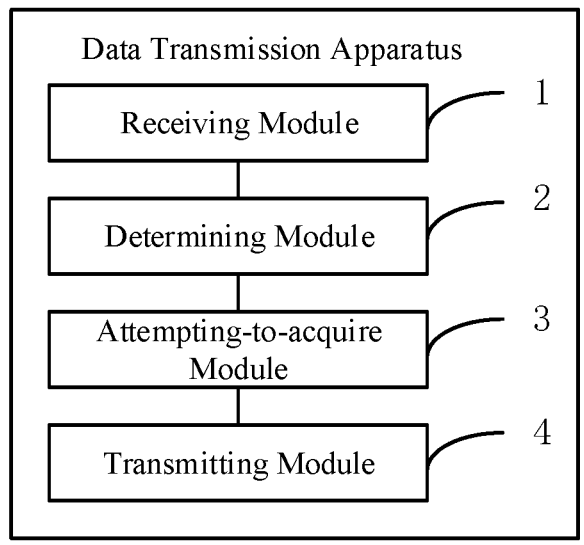
FIG. 5 is a schematic block diagram of a data transmission apparatus according to an embodiment of the present disclosure.

FIG. 5 is a schematic block diagram of a data transmission apparatus according to an embodiment of the present disclosure. The data transmission apparatus shown in the present embodiment may be applied to a user device, such as a mobile phone, a tablet computer and a wearable device.

As illustrated in FIG. 5, the data transmission apparatus shown in the present embodiment may include the following modules.

A receiving module 1 is configured to receive uplink resource allocation information and a redundancy version sequence transmitted by a base station, wherein the uplink resource allocation information is configured to indicate the number of times, a period, a start time, HARQ information and a corresponding HARQ process of retransmission opportunities, and the redundancy version sequence is configured to indicate available transmission opportunities in the retransmission opportunities.

A determining module 2 is configured to determine whether new data needs to be transmitted according to the HARQ information.

An attempting-to-acquire module 3 is configured to attempt, in each of the available transmission opportunities, to acquire a protocol data unit generated by a media access control layer according to the new data starting from a first available transmission opportunity in the available transmission opportunities if the new data needs to be transmitted.

A transmitting module 4 is configured to instruct, starting from a corresponding available transmission opportunity when the protocol data unit is acquired, the HARQ process to transmit the protocol data unit to the base station in each of the retransmission opportunities according to the number of the times, the period and the start time if the attempting-to-acquire module 3 acquires the protocol data unit.

Optionally, the uplink resource allocation information is contained in an RRC message, and/or in a message of a physical downlink control channel, and/or in a random access response message.

Optionally, the uplink resource allocation information is contained in the RRC message. The attempting-to-acquire module is configured to attempt to acquire the protocol data unit of the media access control from a multiplexing and assembly entity.

Optionally, the HARQ information includes a new data indicator field. The determining module is configured to determine whether a relationship between the new data indicator field and a new data indicator field corresponding to an HARQ process closest to the former new data indicator field in history is a flipped relationship, and determine that the new data needs to be transmitted if the relationship is a flipped relationship.

Figure 6:
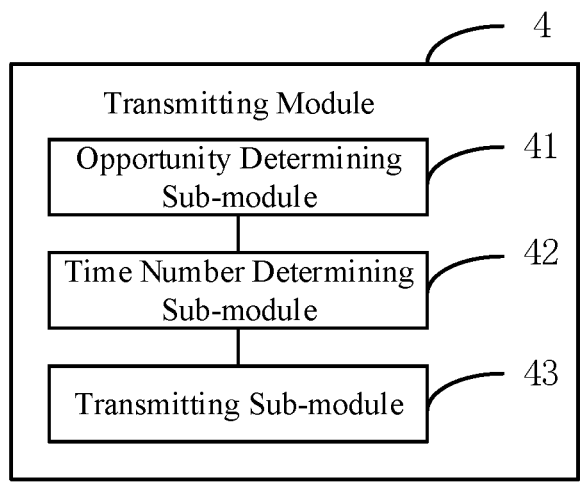
FIG. 6 is a schematic block diagram of a transmitting module according to an embodiment of the present disclosure.

FIG. 6 is a schematic block diagram of a transmitting module according to an embodiment of the present disclosure. As illustrated in FIG. 6, based on the embodiment illustrated in FIG. 5, the transmitting module 4 includes the following sub-modules.

An opportunity Determining Sub-module 41 is configured to determine the corresponding available transmission opportunity when the protocol data unit is acquired.

A time number Determining Sub-module 42 is configured to determine, starting from the corresponding available transmission opportunity when the protocol data unit is acquired, the number of remaining times of the retransmission opportunities according to the corresponding available transmission opportunity when the protocol data unit is acquired and the number of the times of the retransmission opportunities.

A Transmitting Sub-module 43 is configured to instruct, starting from the corresponding available transmission opportunity when the protocol data unit is acquired, the HARQ process to transmit the protocol data unit to the base station in the retransmission opportunities of the remaining times according to the period and the start time.

With respect to the apparatus in the above embodiments, the specific manners for individual modules in the apparatus to perform operations have been described in detail in the embodiments of the related methods, and will not be elaborated herein.

In particular, for the apparatus embodiments, as they are basically corresponding to the method embodiments, the related parts may refer to the descriptions for the method embodiments. The above apparatus embodiments are illustrative only. The units described as separate members may be or may not be physically separated. The members described as units may be or may not be physical units, may be located at the same place or may be distributed in multiple network units. According to actual needs, part of or all of the modules may be selected to achieve purposes of the embodiments of the present disclosure. It can be understood and carried out by those skilled in the art without inventive work.

Embodiments of the present disclosure further provide an electronic device, including.

a processor; and a memory for storing instructions executable by the processor, wherein the processor is configured to:

receive uplink resource allocation information and a redundancy version sequence transmitted by a base station, wherein the uplink resource allocation information is configured to indicate the number of times, a period, a start time, HARQ information and a corresponding HARQ process of retransmission opportunities, and the redundancy version sequence is configured to indicate available transmission opportunities in the retransmission opportunities;

determine whether new data needs to be transmitted according to the HARQ information;

attempt, in each of the available transmission opportunities, to acquire a protocol data unit generated by a media access control layer according to the new data starting from a first available transmission opportunity in the available transmission opportunities if the new data needs to be transmitted; and instruct, starting from a corresponding available transmission opportunity when the protocol data unit is acquired, the HARQ process to transmit the protocol data unit to the base station in each of the retransmission opportunities according to the number of the times, the period and the start time if the protocol data unit is acquired.

Embodiments of the present disclosure further provide a computer-readable storage medium having stored thereon a computer program, and the program, when executed by a processor, causes the processor to implement the following steps:

receiving uplink resource allocation information and a redundancy version sequence transmitted by a base station, wherein the uplink resource allocation information is configured to indicate the number of times, a period, a start time, HARQ information and a corresponding HARQ process of retransmission opportunities, and the redundancy version sequence is configured to indicate available transmission opportunities in the retransmission opportunities;

determining whether new data needs to be transmitted according to the HARQ information;

attempting, in each of the available transmission opportunities, to acquire a protocol data unit generated by a media access control layer according to the new data starting from a first available transmission opportunity in the available transmission opportunities if the new data needs to be transmitted; and instructing, starting from a corresponding available transmission opportunity when the protocol data unit is acquired, the HARQ process to transmit the protocol data unit to the base station in each of the retransmission opportunities according to the number of the times, the period and the start time if the protocol data unit is acquired.

Figure 7:
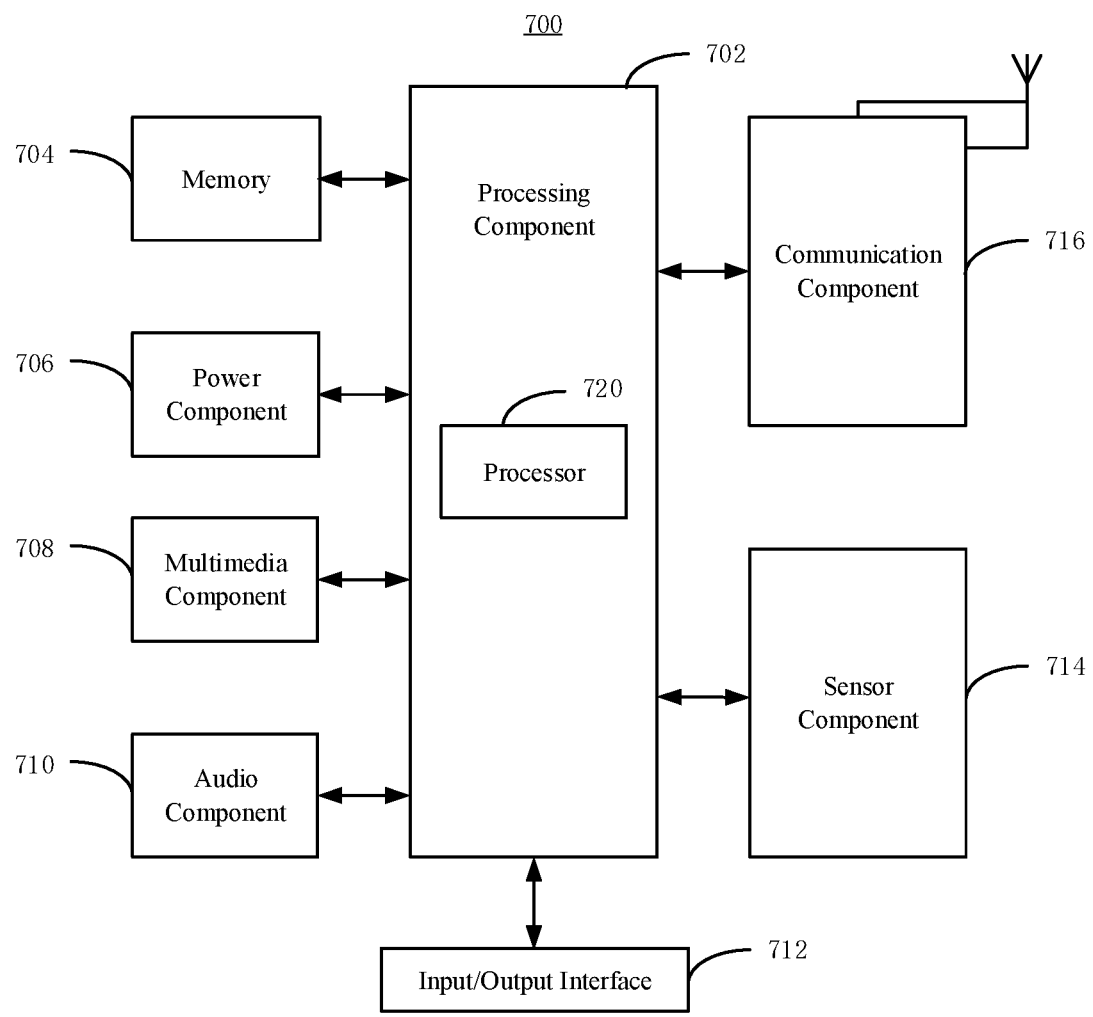
FIG. 7 is a schematic block diagram of an apparatus for transmitting data according to an exemplary embodiment.

FIG. 7 is a schematic block diagram of a data transmission apparatus 700 according to an exemplary embodiment. For example, the apparatus 700 may be a mobile phone, a computer, a digital broadcast terminal, a messaging device, a gaming console, a tablet device, a medical device, a fitness equipment, a personal digital assistant, and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the apparatus 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, videos, etc. The memory 704 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 708 includes a front camera and/or a rear camera. The front camera and the rear camera may receive external multimedia data while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive external audio signals when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and peripheral interface modules, such as a keyboard, a click wheel, buttons, and the like. The buttons may include, but are not limited to, a home button, a volume button, a start button, and a lock button.

The sensor component 714 includes one or more sensors to provide status assessments of various aspects of the apparatus 700. For instance, the sensor component 714 may detect an on/off status of the apparatus 700, relative positioning of components, e.g., the display device and the mini keyboard of the apparatus 700, and the sensor component 714 may also detect a position change of the apparatus 700 or a component of the apparatus 700, presence or absence of user contact with the apparatus 700, orientation or acceleration/deceleration of the apparatus 700, and temperature change of the apparatus 700. The sensor component 714 may include a proximity sensor configured to detect the presence of nearby objects without any physical contact. The sensor component 714 may also include a light sensor, such as a CMOS or CCD image sensor, used for imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 can access a wireless network based on a communication standard, such as WiFi, 2G, or 3G, or a combination thereof. In an exemplary embodiment, the communication component 716 receives broadcast signals or broadcast associated information from an external broadcast management system via a broadcast channel. In an exemplary embodiment, the communication component 716 further includes a near field communication (NFC) module to facilitate short-range communications.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 704 including instructions, executable by the processor 720 in the apparatus 700, for performing the above-described methods. For example, the non-transitory computer-readable storage medium may be a ROM, a RAM, a CD-ROM, a magnetic tape, a floppy disc, an optical data storage device, and the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only.

It will be appreciated that the present disclosure is not limited to the exact construction that has been described above and illustrated in the accompanying drawings, and that various modifications and changes can be made without departing from the scope thereof.

It should be noted that in the context, the relational terms such as first and second are merely used to distinguish one entity or operation from another entity or operation, and do not necessarily require or imply that these entities or operations have any such actual relationship or order. Furthermore, the terms "comprise/include", "contain", or any other variants are intended to cover the nonexclusive containing, such that the processes, methods, commodities or devices including a series of elements not only include those elements, but also include other unclearly listed elements, or also include the inherent elements of such processes, methods, commodities or devices. Without more limitations, the element defined by the phrase "comprising/including a . . . " does not exclude the existence of other same elements in the process, method, commodity, or device that including such element.

The method and apparatus provided by the embodiments of the present disclosure have been described in detail above. Specific examples are used herein to explain the principles and implementations of the present disclosure. The descriptions of the above embodiments are only configured to help understand the method and the core idea of the present disclosure. Meanwhile, for a person of ordinary skill in the art, there will be changes in the specific implementation and the application scope according to the idea of the present disclosure. In summary, the content of the Description should not be understood as a limitation on the present disclosure.

What is claimed is:

1. A data transmission method, comprising:
receiving uplink resource allocation information and a redundancy version sequence transmitted by a base station, wherein the uplink resource allocation information is configured to indicate a number of times, a cycle period, a start time, HARQ information and a HARQ process of retransmission opportunities, and the redundancy version sequence is configured to indicate available transmission opportunities in the retransmission opportunities;
determining whether new data needs to be transmitted according to the HARQ information;
attempting, in each of the available transmission opportunities, to acquire a protocol data unit generated by a media access control layer according to the new data starting from a first available transmission opportunity in the available transmission opportunities when the new data needs to be transmitted; and
instructing, starting from an available transmission opportunity when the protocol data unit is acquired, the HARQ process to transmit the protocol data unit to the base station in each of the retransmission opportunities according to the number of the times, the cycle period and the start time when the protocol data unit is acquired.

2. The method of claim 1, wherein the uplink resource allocation information is comprised in at least one of:

an RRC message, a message of a physical downlink control channel, and a random access response message.

3. The method of claim 2, wherein:
the uplink resource allocation information is comprised in the RRC message; and
attempting to acquire the protocol data unit generated by the media access control layer according to the new data comprises:
attempting to acquire the protocol data unit of the media access control from a multiplexing and assembly entity.

4. The method of claim 1, wherein:
the HARQ information comprises a new data indicator field; and
determining whether the new data needs to be transmitted according to the HARQ information comprises:
determining whether a relationship between the new data indicator field and a new data indicator field corresponding to an HARQ process closest to the former new data indicator field in history is a flipped relationship, and determining that the new data needs to be transmitted when the relationship is a flipped relationship.

5. The method of claim 1, wherein instructing, starting from the available transmission opportunity when the protocol data unit is acquired, the HARQ process to transmit the protocol data unit to the base station in each of the retransmission opportunities according to the number of the times, the cycle period and the start time comprises:
determining the available transmission opportunity when the protocol data unit is acquired;
determining, starting from the available transmission opportunity when the protocol data unit is acquired, the number of remaining times of the retransmission opportunities according to the available transmission opportunity when the protocol data unit is acquired and the number of the times of the retransmission opportunities; and
instructing, starting from the available transmission opportunity when the protocol data unit is acquired, the HARQ process to transmit the protocol data unit to the base station in the retransmission opportunities of the remaining times according to the cycle period and the start time.

6. An electronic device, comprising:
a processor; and
a memory for storing instructions executable by the processor,
wherein the processor is configured to:
receive uplink resource allocation information and a redundancy version sequence transmitted by a base station, wherein the uplink resource allocation information is configured to indicate a number of times, a cycle period, a start time, HARQ information and a HARQ process of retransmission opportunities, and the redundancy version sequence is configured to indicate available transmission opportunities in the retransmission opportunities;
determine whether new data needs to be transmitted according to the HARQ information;
attempt, in each of the available transmission opportunities, to acquire a protocol data unit generated by a media access control layer according to the new data starting from a first available transmission opportunity in the available transmission opportunities when the new data needs to be transmitted; and instruct, starting from an available transmission opportunity when the protocol data unit is acquired, the HARQ process to transmit the protocol data unit to the base station in each of the retransmission opportunities according to the number of the times, the cycle period and the start time when the protocol data unit is acquired.

7. A computer-readable storage medium having stored thereon a computer program, and the computer program, when executed by a processor, causes the processor to implement:
receiving uplink resource allocation information and a redundancy version sequence transmitted by a base station, wherein the uplink resource allocation information is configured to indicate a number of times, a cycle period, a start time, HARQ information and a HARQ process of retransmission opportunities, and the redundancy version sequence is configured to indicate available transmission opportunities in the retransmission opportunities;
determining whether new data needs to be transmitted according to the HARQ information;
attempting, in each of the available transmission opportunities, to acquire a protocol data unit generated by a media access control layer according to the new data starting from a first available transmission opportunity in the available transmission opportunities when the new data needs to be transmitted; and
instructing, starting from an available transmission opportunity when the protocol data unit is acquired, the HARQ process to transmit the protocol data unit to the base station in each of the retransmission opportunities according to the number of the times, the cycle period and the start time when the protocol data unit is acquired.

8. The electronic device of claim 6, wherein the uplink resource allocation information is comprised in at least one of: an RRC message, a physical downlink control channel, and a random access response message.

9. The electronic device of claim 8, wherein:
the uplink resource allocation information is comprised in the RRC message; and
in order to attempt to acquire the protocol data unit generated by the media access control layer according to the new data, the processor is further configured to:
attempt to acquire the protocol data unit of the media access control from a multiplexing and assembly entity.

10. The electronic device of claim 6, wherein:
the HARQ information comprises a new data indicator field; and
in order to determine whether the new data needs to be transmitted according to the HARQ information, the processor is further configured to:
determine whether a relationship between the new data indicator field and a new data indicator field corresponding to an HARQ process closest to the former new data indicator field in history is a flipped relationship, and determine that the new data needs to be transmitted when the relationship is a flipped relationship.

11. The computer-readable storage medium of claim 7, wherein:
the HARQ information comprises a new data indicator field; and
in order to determine whether the new data needs to be transmitted according to the HARQ information, the processor is further configured to:

determine whether a relationship between the new data indicator field and a new data indicator field corresponding to an HARQ process closest to the former new data indicator field in history is a flipped relationship, and determining that the new data needs to be transmitted when the relationship is a flipped relationship.

12. The electronic device of claim 6, wherein, in order to instruct, starting from the available transmission opportunity when the protocol data unit is acquired, the HARQ process to transmit the protocol data unit to the base station in each of the retransmission opportunities according to the number of the times, the cycle period and the start time, the processor is further configured to:
  determine the available transmission opportunity when the protocol data unit is acquired;
  determine, starting from the available transmission opportunity when the protocol data unit is acquired, the number of remaining times of the retransmission opportunities according to the available transmission opportunity when the protocol data unit is acquired and the number of the times of the retransmission opportunities; and
  instruct, starting from the available transmission opportunity when the protocol data unit is acquired, the HARQ process to transmit the protocol data unit to the base station in the retransmission opportunities of the remaining times according to the cycle period and the start time.

13. The computer-readable storage medium of claim 7, wherein the uplink resource allocation information is comprised in at least one of: an RRC message, a physical downlink control channel, and a random access response message.

14. The computer-readable storage medium of claim 12, wherein:
  the uplink resource allocation information is comprised in the RRC message; and
  in order to attempt to acquire the protocol data unit generated by the media access control layer according to the new data, the computer program further causes the processor to implement:
    attempting to acquire the protocol data unit of the media access control from a multiplexing and assembly entity.

15. The computer-readable storage medium of claim 7, wherein:
  the HARQ information comprises a new data indicator field; and
  in order to determine whether the new data needs to be transmitted according to the HARQ information, the computer program further causes the processor to implement:
    determining whether a relationship between the new data indicator field and a new data indicator field corresponding to an HARQ process closest to the former new data indicator field in history is a flipped relationship, and determining that the new data needs to be transmitted when the relationship is a flipped relationship.

16. The computer-readable storage medium of claim 7, wherein, in order to instruct, starting from the available transmission opportunity when the protocol data unit is acquired, the HARQ process to transmit the protocol data unit to the base station in each of the retransmission opportunities according to the number of the times, the computer program further causes the processor to implement:
  determining the available transmission opportunity when the protocol data unit is acquired;
  determining, starting from the available transmission opportunity when the protocol data unit is acquired, the number of remaining times of the retransmission opportunities according to the available transmission opportunity when the protocol data unit is acquired and the number of the times of the retransmission opportunities; and
  instructing, starting from the available transmission opportunity when the protocol data unit is acquired, the HARQ process to transmit the protocol data unit to the base station in the retransmission opportunities of the remaining times according to the cycle period and the start time.

17. The method of claim 2, wherein:
  the HARQ information comprises a new data indicator field; and
  determining whether the new data needs to be transmitted according to the HARQ information comprises:
    determining whether a relationship between the new data indicator field and a new data indicator field corresponding to an HARQ process closest to the former new data indicator field in history is a flipped relationship, and determining that the new data needs to be transmitted when the relationship is a flipped relationship.

18. The method of claim 3, wherein:
  the HARQ information comprises a new data indicator field; and
  determining whether the new data needs to be transmitted according to the HARQ information comprises:
    determining whether a relationship between the new data indicator field and a new data indicator field corresponding to an HARQ process closest to the former new data indicator field in history is a flipped relationship, and determining that the new data needs to be transmitted when the relationship is a flipped relationship.

19. The method of claim 2, wherein instructing, starting from the available transmission opportunity when the protocol data unit is acquired, the HARQ process to transmit the protocol data unit to the base station in each of the retransmission opportunities according to the number of the times, the cycle period and the start time comprises:
  determining the available transmission opportunity when the protocol data unit is acquired;
  determining, starting from the available transmission opportunity when the protocol data unit is acquired, the number of remaining times of the retransmission opportunities according to the available transmission opportunity when the protocol data unit is acquired and the number of the times of the retransmission opportunities; and
  instructing, starting from the available transmission opportunity when the protocol data unit is acquired, the HARQ process to transmit the protocol data unit to the base station in the retransmission opportunities of the remaining times according to the cycle period and the start time.

20. The method of claim 3, wherein instructing, starting from the available transmission opportunity when the protocol data unit is acquired, the HARQ process to transmit the protocol data unit to the base station in each of the retransmission opportunities according to the number of the times, the cycle period and the start time comprises:

determining the available transmission opportunity when the protocol data unit is acquired;

determining, starting from the available transmission opportunity when the protocol data unit is acquired, the number of remaining times of the retransmission opportunities according to the available transmission opportunity when the protocol data unit is acquired and the number of the times of the retransmission opportunities; and instructing, starting from the available transmission opportunity when the protocol data unit is acquired, the HARQ process to transmit the protocol data unit to the base station in the retransmission opportunities of the remaining times according to the cycle period and the start time.

* * * * *